(12) United States Patent
Hosken

(10) Patent No.: US 6,763,354 B2
(45) Date of Patent: Jul. 13, 2004

(54) MINING EMERGENT WEIGHTED ASSOCIATION RULES UTILIZING BACKLINKING REINFORCEMENT ANALYSIS

(75) Inventor: Benjamin E. Hosken, Hawthorn (AU)

(73) Assignee: AgentArts, Inc., San Francisco, CA (US)

( * ) Notice: Subject to any disclaimer, the term of this patent is extended or adjusted under 35 U.S.C. 154(b) by 0 days.

(21) Appl. No.: 10/143,381

(22) Filed: May 10, 2002

(65) Prior Publication Data

US 2003/0212651 A1 Nov. 13, 2003

(51) Int. Cl.$^7$ ............................................... G06F 17/30
(52) U.S. Cl. ..................... 707/6; 707/2; 707/4; 707/10; 707/100; 707/102; 706/46; 706/47; 706/56; 706/60; 706/61
(58) Field of Search .................... 707/1–10, 100–104.1, 707/200–205; 706/45–50, 1–12, 56, 60–61

(56) References Cited

U.S. PATENT DOCUMENTS

| | | | |
|---|---|---|---|
| 4,719,571 A | | 12/1988 | Rissanen et al. |
| 5,515,534 A | * | 5/1996 | Chuah et al. ................ 707/101 |
| 5,615,341 A | | 3/1997 | Agrawal et al. |
| 5,704,017 A | | 12/1997 | Heckerman et al. |
| 5,794,209 A | | 8/1998 | Agrawal et al. |
| 5,802,256 A | | 9/1998 | Heckerman et al. |
| 5,854,630 A | * | 12/1998 | Nielsen ....................... 345/739 |
| 5,933,818 A | * | 8/1999 | Kasravi et al. ................ 706/12 |
| 5,983,224 A | | 11/1999 | Singh et al. |
| 6,049,797 A | | 4/2000 | Guha et al. |
| 6,061,682 A | * | 5/2000 | Agrawal et al. ................ 707/6 |
| 6,094,645 A | | 7/2000 | Aggarwal et al. |
| 6,175,830 B1 | * | 1/2001 | Maynard ....................... 707/5 |
| 6,212,526 B1 | | 4/2001 | Chaudhuri et al. |
| 6,240,411 B1 | | 5/2001 | Thearling |
| 6,249,773 B1 | * | 6/2001 | Allard et al. .................. 705/26 |
| 6,272,478 B1 | * | 8/2001 | Obata et al. .................. 706/12 |
| 6,282,548 B1 | | 8/2001 | Burner et al. |
| 6,324,533 B1 | * | 11/2001 | Agrawal et al. ............... 707/3 |
| 6,438,579 B1 | * | 8/2002 | Hosken ...................... 709/203 |
| 6,567,814 B1 | * | 5/2003 | Bankier et al. ............. 707/101 |

FOREIGN PATENT DOCUMENTS

WO  WO01050347 A1 * 7/2001

OTHER PUBLICATIONS

Sergey B et al., Dynamic data mining : exploring large rule spaces by sampling, VLDB 1998, pp 1–21.*
Yu et al., Feature Weighting and Instance Selection for Collaborative Filtering, Proc. 2nd International Workshop in Management of Information on the Web (MIW '01).
Agrawal et al., Mining Association Rules between Sets of Items in Large Databases, Proc. of the 1993 ACM SIGMOD Conf., Washington DC May 1993.

(List continued on next page.)

Primary Examiner—Srirama Channavajjala
(74) Attorney, Agent, or Firm—NewTechLaw; Gerald B. Rosenberg, Esq.

(57) ABSTRACT

A system and methods providing for the evaluation of transaction data records to first determine forward link associations between items as reference and related items identified by corresponding "expert" users as a basis for establishing expert database item association rules. The forward link associations are then evaluated to identify back link associations between reference and related items. Back link weights, corresponding to the respective back link associations reflecting the depth and strength of the back linked associations are determined and associated with the forward link associations to provide an augmented basis for subsequently evaluating the association rules collected into an expert database.

28 Claims, 3 Drawing Sheets

OTHER PUBLICATIONS

Ester et al., Knowledge Discovery in Large Spatial Databases: Focusing Techniques for Efficient Class Ident, Proc. of the 4th Int. Symp. on Large Spatial Databases (SSD '95).

Flake et al., Self–Organization of the Web and Identification of Communities, IEEE Computer, 35(3), 66–71, 2002.

Breese et al., Empirical Analysis of Predictive Algorithms for Collaboratifve Filtering, Proc. of the 14th Conf. on Uncertainty in Artificial Intelligence, Jul. 1998.

Flake et al., Efficient Identification of Web Communities, Proc. of the 6th Int. Conf. on Knowledge Discovery and Data Mining (ACM SIGKDD–2000), pp. 150–160, Aug. 2000.

* cited by examiner

| | ITEM | ITEMREL | DEPTH | COUNT | STRENGTH |
|---|---|---|---|---|---|
| ITEM SET RELATIONSHIPS | A | B | 1 | C20 | S1 |
| | A | F | 2 | C21 | S2 |
| | A | J | 3 | C22 | S3 |
| | C | H | 1 | C23 | S4 |
| | D | I | 1 | C24 | S5 |

BACKLINK DATA

MINING EMERGENT WEIGHTED ASSOCIATION RULES UTILIZING BACKLINKING REINFORCEMENT ANALYSIS

BACKGROUND OF THE INVENTION

1. Field of the Invention

The present invention is generally related to systems and processes of analyzing transactional database information to mine data item association rules and, in particular, to a system and method of backlinking reinforcement analysis of transactional data to establish emergent weighted association rules.

2. Description of the Related Art

Data mining systems and tools are utilized to determine associative relationships within data as contained in typically large-scale information databases. Where the source information represents, for example, commercial transactions conducted with respect to discrete items, association relationships between different items can be determined by analysis with relative degrees of accuracy and confidence. These association relationships can then be utilized for various purposes including, in particular, predicting likely consumer behaviors with respect to the set of items covered by the transaction data. In practical terms, the presentation and substance of product designs, marketing campaigns and the like can then be tailored efficiently to reflect consumer interest and demand.

Conventionally, the relationships mined from transactional information databases are collected as association rules within a reference database, generally referred to as an expert database. Each association rule is qualified, relative to the items in the relation, with a weight representing the significance or strength of the association between the items. A collected set of association rules can then be used to provide solutions to various problems presented as query assertions against the expert database. In conventional implementation, a relational trace through the expert database, discriminating between various relationship branches based on the associated relative weightings, allows a query to be resolved to a most highly correlated solution set of related items. The query itself may be represented as an identified item, item set, or attributes that are associated with the items identified within the expert database.

Automated association mining techniques, as opposed to manual processes of knowledge engineering used to create expert databases, are preferred particularly where the volume of data to be evaluated is large and where the usefulness of the mined associations degrades rapidly over time. Conventional automated association mining analysis techniques, however, are subject to a variety of limitations. In particular, the automated techniques tend to identify associations exponentially with the number of items identified within the transaction data. The performance of queries against an expert database naturally degrades with increases in the database size. Furthermore, many of the association rules generated may be irrelevant to the defined or even likely queries that will be asserted against the expert database.

Another problem is that variations in the underlying transactional data may affect the relative quality of the potential associations. The analysis determined strength of the associations identified may be distorted by the number of times particular items are identified in the transactional data and by the distribution of the items within the larger set of transactions. Thus, the confidence in the determined strengths of the relationships identified by the automated analysis can vary significantly.

In conventional systems, association rules are generated through an algorithmic processing of a transaction data record set representing, for example, a series of commercial transactions. Depending on the nature of the source transactional data, item associations are initially identified based on the rate of occurrence of unique item pairings or, where a transaction involves multiple items, sets of items. The occurrence rate for a specific item set within the set of transaction data records is conventionally referred to as the item set support. As described in "Mining Association Rules between Sets of Items in Large Databases" by Agrawal, Imielinski and Swami, *Proc. of the 1993 ACM SigMod Conf. on Management of Data*, May 1993, pp. 207–216, a minimum support threshold can be established to discriminate out insignificant item sets. As described there, the threshold support value is empirically selected to represent a statistical significance determined from business reasons. In the example provided, the threshold minimum support value was set at 1%. Association rules having a support less than the threshold support value, representing associations of less than minimal significance, are discarded.

The Agrawal article also describes the use of syntactic constraints to reduce the size of the generated expert database. The items that are of interest for queries or, conversely, the items that are not of interest may be known in advance of rule generation. A corresponding constraint on the generation of association rules is implemented in the algorithmic examination of transaction data records with the result that only association rules of interest are generated and stored to the expert database.

Finally, the Agrawal article describes a technique for assessing the confidence of the strength of association rules. The technique presumes that, in discovering the solution set for a query, the relative validity of rule strengths in the solution paths can be normalized based on the relative representation of association rules within the transaction data set. The conventional calculation of confidence for a given association rule, as presented by Agrawal, is the fraction of source transaction data records that support the association rule. That is, the confidence C of an association rule $X \Rightarrow I$, where X is an item set identified within a transaction data set T and I is a single item not in X, is the ratio of the support of $X \Rightarrow I$ divided by the support of X.

The confidence determined for an association rule is used in the Agrawal article can be used as a threshold value for qualifying generated association rules for inclusion in the expert database. Association rules with a confidence level exceeding some defined minimum value are, in effect, deemed minimally reliable. The determination of the threshold confidence level is again empirical, based generally on an evaluation of the statistical insignificance of the rules excluded.

The support and confidence values determined for the minimally relevant and reliable association rules are conventionally stored with the corresponding rules within the expert database. Subsequent evaluation of queries against the expert database can utilize these support and confidence values, in part, to determine the optimal solution sets. U.S. Pat. No. 6,272,478, issued to Obata et al., describes the generally similar application of assigned evaluation values for association rules. Specifically, cost and sales values are assigned as attributes to association rules to permit evaluation of additional criteria in determining an optimal set of association rules to use in reaching a solution set for an applied query. The evaluation of these additional criteria permit, for example, selection of solution sets that optimize profitability. Where multiple items are specified in the antecedent and consequent terms of an association rule, mathematical formulas corresponding to the included item sets are used in the evaluation of the association rule. While the evaluation values and formulas may be stored in an item dictionary provided with the expert database, the evaluation values and formulas are derived independent of the support and confidence values.

The generation of an expert database with associations having defined minimum relevancy and reliability enables broad query assertions to be adequately resolved to solution sets of at least equal minimum relevancy and reliability. Any progressive evaluation of the support and confidence values of association rules applied in determining a solution set can be used to raise and change the minimum relevancy and reliability of the solution set reached. Furthermore, the additional consideration of independent evaluation criteria enables targeted factors to be considered in determining the ultimate solution set for an applied query.

The evaluation of additional, separately supplied information correlated to the transaction items thus permits the generated association rules set to be evaluated for a specific purpose. The accuracy and reliability of any solution sets generated, however, remains limited largely to the accuracy and reliability of the underlying association rules as a whole. Relationships potentially reflected in transaction data and that meet the minimum support and confidence criteria used by conventional mining techniques may not be substantially differentiated by conventionally derived association rules in any meaningful manner. Therefore, conventionally generated expert databases are thereby limited in the quality and extent of the information that can be derived from the databases.

Consequently, there is a need to provide for the automated generation of expert databases that supports degrees of accuracy and reliability well discriminated beyond the limits of the minimum support and confidence criteria used by conventional mining techniques.

SUMMARY OF THE INVENTION

Thus, a general purpose of the present invention is to provide an efficient system and methods of generating expert databases that can be used to support decision processes with a high and well-discriminated degree of accuracy and reliability.

This is achieved in the present invention by a system and methods that provide for the evaluation of transaction data records to first determine forward link associations between items as reference and related items identified by corresponding "expert" users as a basis for establishing expert database item association rules. The forward link associations are then evaluated to identify back link associations between reference and related items. Back link weights, corresponding to the respective back link associations reflecting the depth and strength of the back linked associations are determined and associated with the forward link associations to provide an augmented basis for subsequently evaluating the association rules collected into an expert database.

An advantage of the present invention is that the association rules used to construct an expert database provide a greater degree of reliability and accuracy in the solutions sets obtained from queries against the expert database. Experts are preferably identified on a per-reference item basis, directly enabling identification of associations of high predictive significance.

Another advantage of the present invention is that identification of back linked relationships through chains of relevant "expert" user sub-populations enables a direct reinforcing of associations of high predictive significance. The relative reinforcement of associations is used to increase the predictive weight of the corresponding association rules of the expert database.

A further advantage of the present invention is that the system and processes of generating sets of association rules for expert databases are autonomous based on an established set of analysis parameters. Preferably, these analysis parameters set thresholds for the detailed analysis procedure largely based on relatively non-critical empirical examinations of the source transaction data records, the nature of the items transacted, and the number of users identified in the pool of transaction data records.

BRIEF DESCRIPTION OF THE DRAWINGS

These and other advantages and features of the present invention will become better understood upon consideration of the following detailed description of the invention when considered in connection with the accompanying drawings, in which like reference numerals designate like parts throughout the figures thereof, and wherein.

DETAILED DESCRIPTION OF THE INVENTION

The present invention is preferably utilized to generate expert databases through a computer automated process operating from collections of transactional data records. These source records are typically representative of or related to commercial transactions, though more broadly are specifications of quantifiable actions taken by users against items of discrete identity. For the preferred embodiments of the present invention, the transaction data records reflect e-commerce related actions by network connected users, such as sampling various multimedia content, reading reviews and recommendations of the content, and purchasing the content.

Figure 1:
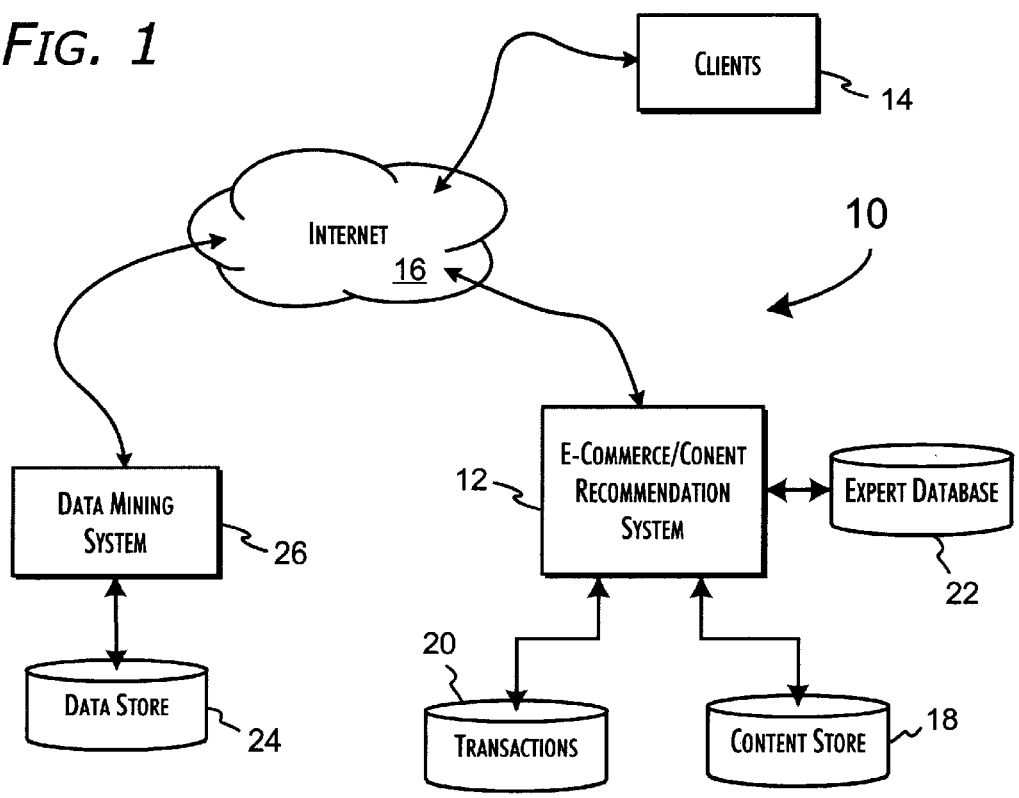
FIG. 1 is a network diagram showing a preferred environment for the practice of the present invention.

As shown in FIG. 1, a typical and preferred application environment 10 of the present invention involves an e-commerce site 12 that supports the browsing and purchase of multimedia content, such as conventional audio tracks and albums. The e-commerce site 12 is preferably implemented as a network server system that executes a computer automated content recommendation application, such as that described in the co-pending application "Methods and System for Generating Automated Alternative Content Recommendations," by Benjamin E. Hosken, Ser. No. 09/616,474, and assigned to the Assignee of the present application, which is hereby incorporated by reference. The content recommendation system permits users, operating client computer systems 14, to connect through a communications network 16, such as the Internet, to browse multimedia content stored directly or indirectly by a content store 18 that is accessible through the e-commerce site 12. In the preferred embodiments of the present intention, the content store 18 includes an archive of reviews, background and historical information, artwork, sample clips, and purchasable copies of audio content.

Transaction activities of browsing users are captured typically in real-time to a transactions database 20. The captured transactions may reflect any content related identifiable action taken by the users ranging from the clicking of links associated with particular content, listening to streaming content samples, and completing e-commerce content purchases. Generally in connection with the recognition of many of these activities, the content recommendation application is invoked to suggest alternative content that may be collaterally of interest to the user. These recommendations are generated preferably by parsing the user action to establish a query applicable to the association rules of an expert database 22. The solution set of alternative content recommendations identified by the evaluation of the query against the expert database 22 is then presented to the user.

In accordance with the present invention, expert databases 22 are generated through an automated analysis of the transaction data records accumulated through the operation of the e-commerce site 12. Transactional data records can be equivalently obtained from other sources of similar transactional information, such as portal Web sites and conventional retail, mail order, and wholesale content, information, and merchandise distribution sites. The transaction data records are transferred, typically in batch, to a data store 24 associated with a data mining server system 26. After analysis performed by a data mining application program executed by the data mining server system 26, a set of association rules, constituting a new expert database 22, are generated and returned to the e-commerce site 12.

Figure 2:
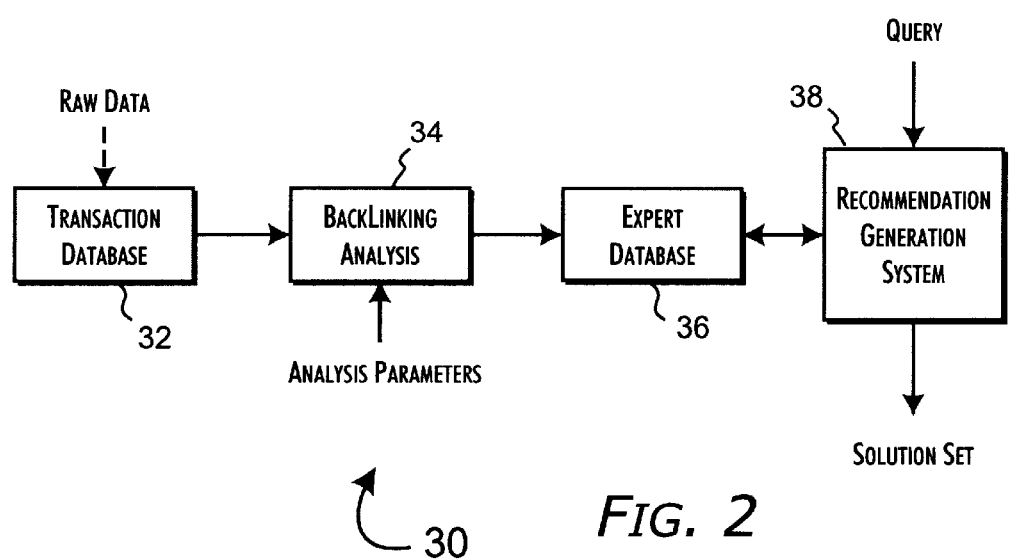
FIG. 2 is a block diagram detailing the generation and use of an expert database in accordance with a preferred embodiment of the present invention.

As further detailed in the system level process 30 shown in FIG. 2, the transaction record data is preferably stored to a transaction database 32, within the data store 24, for access by the analysis program. In accordance with the present invention, the analysis program 34 implements a backlinking analysis to distinguish association rules of substantial relational value between the actionable items identified within the transaction data records. The goal of the backlinking analysis 34 is to generate association rules 36 representing verified relationships between the transacted items. That is the backlinking analysis discriminates for association rules that are not merely of potential consequence, but rather seeks to distinguish association rules that are highly probative of item relationships and thereby represent a more expert, as opposed to mere mechanical, analysis of the transaction data records. The resulting expert database 36 can thereby provide a more authoritative basis for the operation of a recommendation generation system 38. The focus and extent of the discrimination for verified and probative relationships are preferably determined by analysis parameters provided to the backlinking analysis program 34.

Figure 3:
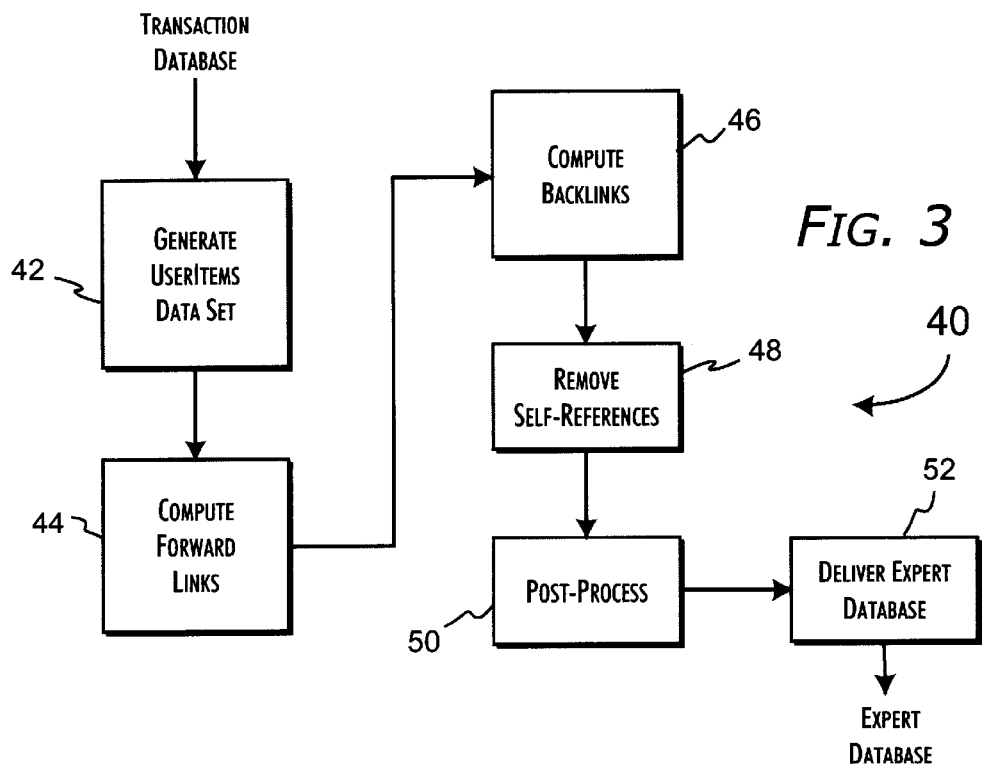
FIG. 3 is a flow diagram of the preferred process of generating an expert database in accordance with a preferred embodiment of the present invention.

The preferred process 40 of backlinking analysis is shown in FIG. 3. Transaction data records correspond or are conformed generally to a consistent data presentation form, such as the preferred UserTransactions data record detailed in Table 1.

TABLE 1

User Transaction Record

```
UserTransactions {
    userID       // identifier of a unique user/entity
    itemID       // identifier of a unique item
    actionID     // e.g.: purchase, download, mouse-click
}
```

The user identifier userID is typically assigned to individual, transacting entities by the e-commerce site 12, but may also represent a collective identifier of transacting entities of interest. The item identifier itemID is similarly an e-commerce site 12 assigned identifier typically of a discrete transactionable item. The item itself may correspond to some specific content or information or to an article of manufacture, either digitally or physically delivered. Alternately, the item specified by a transaction data record may represent an element of a collective item, such as the content tracks of an album or attributed to an artist.

An item specification record, as detailed in Table 2, is preferably provided in connection with the transaction data records to associate item attributes with particular items (itemIDs). In addition to identifying elements of the item, the item attributes may be used subsequently to additionally discern relationships between the actions taken with regard to the items identified in the transaction data records.

Finally, the action identifier actionID is used to specify the item and user specific action taken. The nature of the action will be dependent on the nature of the actionable items presented by the e-commerce site 12. Where the purpose of the e-commerce site 12 is to provide alternate content recommendations, the actions of interest preferably include browsing of content reviews and background information, viewings of content related graphics and art, downloads of content and content samples, and the purchasing of content.

TABLE 2

Item Specification Record

```
Items {
    itemID          // identifier of a unique item
    Description     // text description of the item
    attribute_1 ... attribute_N // item categorizes/qualifiers
}
```

From the UserTransactions data records, user items data sets are generated 42, preferably presented in the form of UserItems records as detailed in Table 3. A cumulative weight value is determined for each unique combination of user and item identified in the transaction data records.

TABLE 3

UserItems Weighted Associations Record

```
UserItems {
    userID       // identifier of a unique user/entity
    itemID       // identifier of a unique item
    weight       // cumulative calculated weight value
}
```

Preferably, the weight value contributed from each transaction data record is determined from an action/base__ weight translation table, which defines relationships between transaction actionIDs and additive base_weights, subject to the application of a computational function identified by a rule value. A preferred action/weight translation record is detailed in Table 4.

TABLE 4

Action/Base_Weight Translation Record

```
ActionWeightTranslation {
        actionID      // e.g.: purchase, download, mouse-click
        rule          // defined calculation function
        base_weight   // click = 0.1, play = 0.25, purchase = 1.0
}
```

The action/weight translation records are preferably generated using empirically assigned base_weights and rules. In the preferred embodiments of the present invention, the base_weight value ranges between 0 and 1 and is assigned to reflect the likely significance of the corresponding action. Thus, for an e-commerce site 12 supporting electronic purchases of content, actionable user activities are distributed over the range with, for example, the browsing retrieval of a content review page being assigned a low base_weight value while the actual purchase of content being assigned the maximum base_weight value.

Generation of the user items data sets is preferably performed by a progressive processing of the UserTransactions data records consistent with the pseudocode procedure presented in Table 5. This procedure operates to consolidate the UserTransactions data records to produce a final, cumulative weight for each unique combination of user and item.

TABLE 5

Generation of UserItems Weighted Associations

```
For each Transaction T in UserTransactions
    Lookup userItem UI in UserItems using T.itemID and T.userID
    Lookup actionID in ActionWeightTranslation
    Apply Rule Function and generate new cumulative weight W
    Insert or Update UI Record with weight W
End For
```

The rule function applied in execution of the procedure may be simple or complex, set empirically based on an evaluation of the nature of the item and action. In the simplest case, the rule may define a linear summation function. A more involved rule may define ceiling values for the portions of the weight attributable to different identified actions in proportion to other actions, such as actual purchases. In reference to the preferred embodiments of the present invention, a rule function may be assigned to actions involving an identified music artist. The contribution to the accumulated weight W for a current action may be defined as equaling a scaling constant k multiplied by the total number of music content tracks purchased by the user, further multiplied by the base_weight value for the action. A more complex rule could involve selectively revaluing actions based on subsequent actions taken by a user. For example, if user actions include both sampling and purchasing a music content track, then the weight contribution attributable to the sampling action is discounted. Where a performance ticket is also purchased, the weight contribution due to the total number of music content tracks purchased by the user is increased by using a larger scaling constant k1.

For the present invention, the accumulation of the weight values for the different elements of the user item data sets provides an accurate basis to discern a set of "expert" users from the community of users represented in the original transaction data records. While the base_weight values and assigned rule functions must generally represent the relative significance of the user behaviors to the ultimate association rules of interest, the base_weight values and rule functions do not need to generate extremely small discrete differences in the cumulative weights determined. Rather, broad weight value ranges accumulated against collective items are capable of providing an accurate basis for discerning the desired set of "expert" users. Particularly in the preferred embodiments of the present invention, the accumulation of weights against items representing collections of works of by various artists is sufficient to discern "expert" users with regard to different artists for the ultimate purpose of providing alternate content recommendations.

A forward link analysis of the user item data sets is then performed 44. The forward link analysis preferably utilizes a ForwardLinks data record as detailed in Table 6, to store a forward links data structure representation.

TABLE 6

ForwardLinks Record

```
ForwardLinks {
        itemID        // identifier of a reference item
        itemIDRel     // identifier of a related item
        count         // relation support counter
}
```

The ForwardLinks data records are generated through execution of an item link analysis of the UserItems data records consistent with the pseudocode procedure presented in Table 7. This forward links generation procedure operates to first identify user "experts" with respect to different items and then determine the support by these user "experts" for user item data set related items.

TABLE 7

Generation of ForwardLinks

```
For each I.itemID in Items I
    Look up top A userID from UserItems UI who have
        UI.itemID == I.itemID and
        UI.weight > Weight B
    For each user U in top A userID Ordered by UI.weight
        For each UI.userItem for U.userID
            Look Up ForwardLinks FL where
                UI.itemID == FL.itemID and
                UI.itemID == FL.itemIDRel
            If found
                Update ForwardLinks
                    set FL.count = FL.count + 1
            Else
                Insert into ForwardLinks
                    (I.itemID, UI.itemID, 1)
            End If
        End For
    End For
End For
Delete from ForwardLinks all records where
    FL.count < count C    // threshold prune forward links
```

In the forward links generation procedure, a set of "expert" users with respect to a designated item is first preferably determined by identifying the users having the greatest recognized activity with respect to the item. The top A users by cumulative weight value for the current item are selected from the UserItems table. Preferably, the selection of the top A users is performed based on specification of an expert threshold weight B value provided as an analysis parameter to the backlinking analysis process 40.

While an empirically determined top A value of 30 has provided good operational results in the preferred embodiments of the present invention, a target top A value is preferably selected as a percentage of the user population in the general case. This percentage may be determined through statistical analysis of the distribution of the weight values relative to the user population or by successive evaluation of the quality of expert databases ultimately produced while progressively increasing the user population percentage used in generating the database. The target percentage used, however, is preferably well less than 50% of the user population and will be typically less than 30% for any given item. Although dependent on the specific nature of the information represented in the transaction data records, "expert" user sub-populations representing less than 10% of the user population on a per-item basis can, in accordance with the present invention, provide a robust basis for the ultimate generation of expert databases 36.

Figure 4:
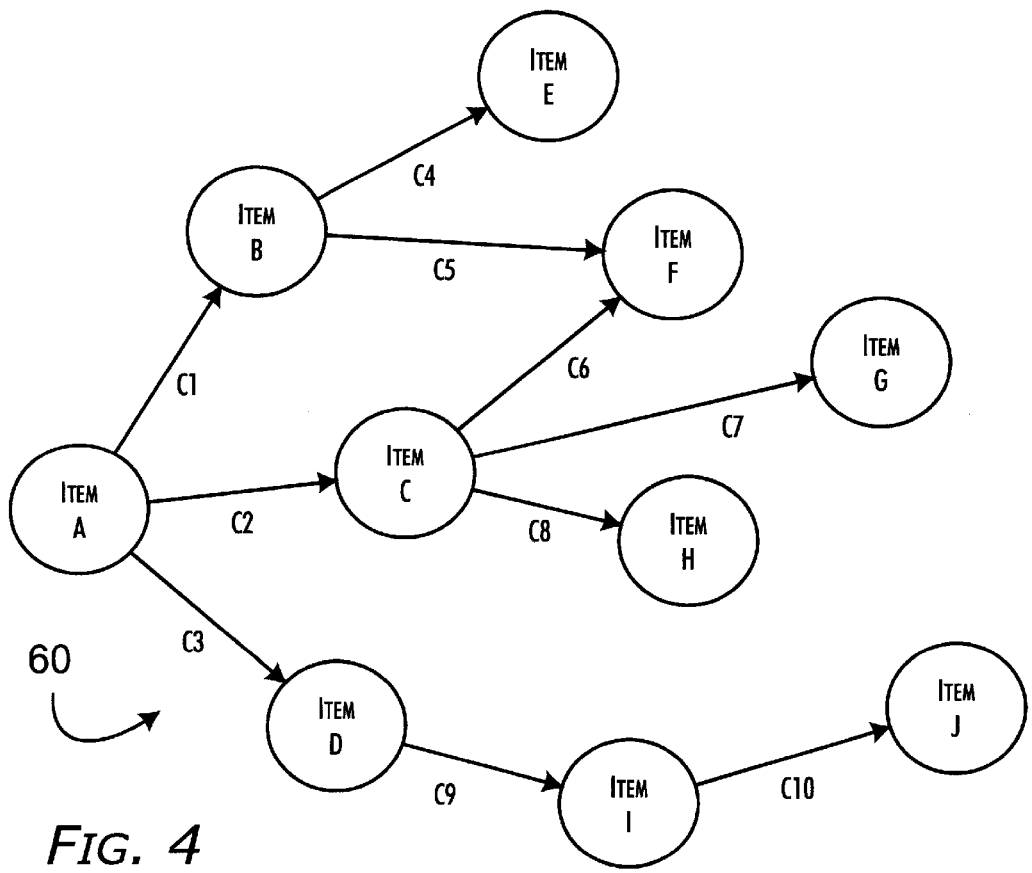
FIG. 4 is a diagram of a node network representing a forward link structure defined by relationships between user item sets in accordance with a preferred embodiment of the present invention.

The forward links generation procedure then determines a support count for reference/related pairs of items occurring within the user item data sets of the "expert" users. The support count count value is determined as the number of times that the "expert" user sub-population for a reference item have executed a transaction for a given related item. The reference/related item pairings and respective support count values are accumulated in the ForwardLinks record table. Once the support counts have been accumulated, a minimum support threshold requirement is asserted. Forward link data records having a support count less than a defined minimum support threshold are removed from the ForwardLinks record table. This minimum support threshold requirement, provided as an analysis parameter to the backlinking analysis process 40, in effect defines the minimum level of agreement of the relatedness of forward linked items by the community of "expert" users. The minimum preferred support threshold is a count of two. While a higher, empirically set fixed minimum support threshold can be used, preferably the minimum support threshold is adaptively based on the top A number of "expert" users identified for each reference item, subject to a fixed limit, which may be empirically set based on consideration of the total number of reference items. Thus, for example, for a 10,000 item catalog, the minimum support threshold limit may be set at 500 for "expert" sub-populations of at least 100 users. Where the top A "expert" user sub-population for a reference item is less than 100, the minimum support threshold limit is decreased pro-rata down to the preferred minimum support count limit of two. FIG. 4 provides a general illustration of the data structure 60 generated by the forward links procedure. The data structure 60 is a linked node structure where the item links are defined by the item relative support counts.

A back link analysis of the forward link data structure 60 is then performed 46. The back link analysis preferably operates over the ForwardLinks data table to generate backlink data records of a form detailed in Table 8.

TABLE 8

BackLinks Record

| | |
|---|---|
| BackLinks { | |
| itemID | // identifier of a reference item |
| itemIDRel | // identifier of a related item |

TABLE 8-continued

BackLinks Record

| | |
|---|---|
| strength | // relationship distance metric |
| depth | // node traversal count |
| } | |

The BackLinks data records are generated through execution of a backlink analysis operation consistent with the pseudocode procedure presented in Table 9. This back links generation procedure operates to identify and quantify reinforcing relationships that may exist between items nominally unrelated through the forward links analysis. In effect, back link analysis operates to identify relationships between items that are at least inferentially agreed upon by different "expert" user sub-populations.

TABLE 9

Generation of BackLinks

```
For each I.itemID in Items I
    Do a depth-first search over ForwardLinks FL
        Looking for I.itemID == FL.itemIDRel
        If found
            Insert into BackLinks
                (I.itemID, FL.itemID, func (FL.count), depth)
            Break depth-first search
        End If
    While the search depth < depth D
End For
```

A depth-first search is preferably performed over the records of the forward links data table using the item catalog provided by the items specification table to sequentially identify reference items. The depth-first search operates down each forward link branch to identify, subject to a recursion depth limitation D, a first forward link record that specifies the branch root reference item as the forward link related item. The depth limitation D value is preferably provided as another analysis parameter to the backlinking analysis process 40. The depth-first search of a branch is terminated whenever a back link is found. Any potential subsequent back link on a branch will be discovered, if within the depth limitation count D, on subsequent progression of the selected branch root node down the nodes of the branch. When a back link is found, a back link data record containing the reference/related item pair, a calculated relationship strength value, and the relative node network depth of the found forward link data record is stored to the BackLinks data table.

In accordance with the present invention, a found back link is recognized as reinforcing the significance of the forward link reference/related item association identified by the back link. The present invention further recognizes that the closer the back link is to the relevant branch root node, representing a progressively greater degree of agreement through a chain of relevant "expert" user sub-populations, the greater the significance of the back link. Thus, the significance of back links to the effectiveness of the expert database 36 is expected to diminish with increased relative node depth of the back links. Using large values for the depth limitation D value is therefore not believed to be particularly beneficial. Increasing the depth limitation D value, however, does increase analysis processing time. For the preferred embodiments of the present invention, excessively large D values are to be avoided. Preferably, the depth limitation count D is in the range of two to eight, with a value of four being empirically found to provide a reasonable balance between efficacy of the generated expert database 36 and link analysis processing time.

Figures 5, 6:
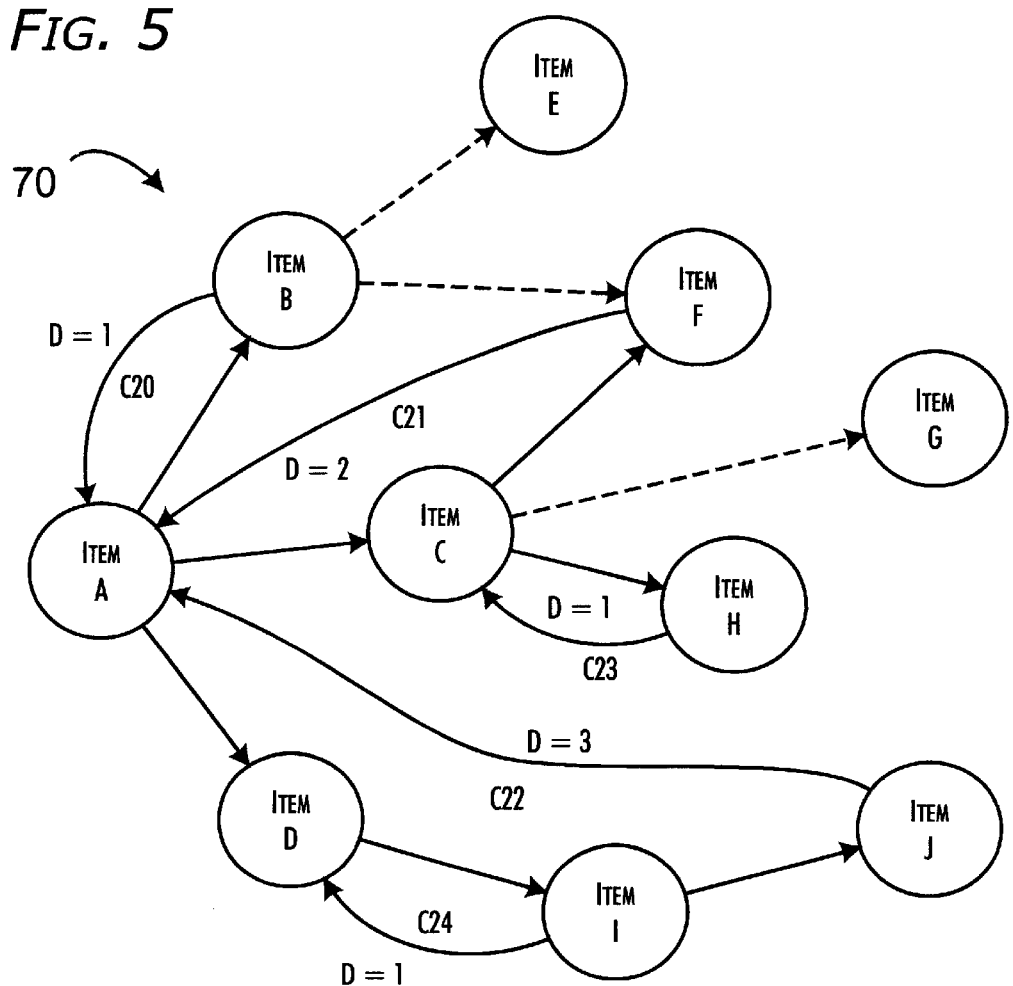
FIG. 5 is a diagram of the node network of FIG. 4 further detailing the identification of back links as a basis for verifying item associations in accordance with a preferred embodiment of the present invention.
FIG. 6 provides an illustrative representation of an expert database generated in accordance with a preferred embodiment of the present invention.

The depth value is determined relative to the selected root node during each depth-first search. A representative forward linked node structure 70 with illustrative back link relations is shown in FIG. 5. Back link relations found from depth-first searches of the structure 70 starting from the node representing an item A includes items B, F, and J at respective node depths of 1, 2, and 3. On progression of the branch root to items C and D, respective back links of depth 1 are found with respect to items H and I.

The strength parameter associated with a back link is computed as a function of the support count of the back link and, equivalently, of the support count of the terminal ForwardLinks data record that establishes a back link. Preferably, the strength parameter reflects the percentage support of the relationship identified by the backlink by "expert" users as a function of the prevalence of root forward link "expert" users in the user pool. Thus, for preferred embodiments of the present invention, the strength parameter is computed as $$Strength_{BL} = m\left(\frac{Count_{BL}}{Experts_{BL}}\right) \cdot \left(\frac{Experts_{RFL}}{Users}\right) \quad \text{Eq. 1}$$

where m is an empirical scaling constant, $Count_{BL}$ is the back link support count, $Experts_{BL}$ is the number of users who are "expert" in the back link item relationship, $Experts_{RFL}$ is the number of users who are "expert" in the relevant branch root forward link item relationship, and Users is the number of users identified in the pool of transaction data records. The strength value computed for a back link is stored to the corresponding BackLinks record, generally as represented in FIG. 6.

The BackLinks records are next evaluated to remove occurrence of self-references. A self-reference occurs where the reference and related item pair refer to the same item. Preferably, self-references are removed in an analysis operation consistent with the pseudocode procedure presented in Table 10.

TABLE 10

Self-References Removal

```
For each Link BL in BackLinks
    If BL.itemID == BL.itemIDRel    // it is a self-reference
        Delete BL from BackLinks
    End If
End For
```

Finally, the association rules representing the expert database 36 are generated in correspondence with the reference/related item pair associations identified by the ForwardLinks data records and stored in AssociationRules records of a form detailed in Table 11.

TABLE 11

Association Rules Record

```
AssociationRules {
    item ID         // identifier of a reference item
    itemIDRel       // identifier of a related item
    count           // relation support counter
    confidence      // computed rule confidence metric
```

TABLE 11-continued

Association Rules Record

```
    strength        // relationship distance metric
    depth           // node traversal count
}
```

Preferably, the generated association rules carry forward the support counts from the corresponding ForwardLinks data records and, optionally, calculated confidence values. For the preferred embodiments of the present invention, the confidence value may be pre-calculated and normalized as needed in a conventional manner. For example, a confidence value may be computed as the ratio of the support for a reference/related item pair to the total number of associations including the reference item. Where the confidence value is not pre-calculated for the association rules, sufficient information is included in the AssociationRules records to permit subsequent computation.

In accordance with the present invention, the AssociationRules record also includes the strength and depth values for the associated reference/related item pair directly, as a component of the calculated confidence value, or as a derivative value computed from the strength and depth values. Direct inclusion of the strength and depth values permits flexibility in the utilization of the expert database 36. Incorporating the strength and depth values in the pre-calculated confidence value permits generation of an expert database 36 most compatible with conventional uses of expert databases. Including a combined value for the strength and depth values provides a metric that may be easier to use without losing the benefit of the strength and depth values.

In accordance with the present invention, the otherwise existing confidence of a reference/related item association is increased by the strength and the inverse of the depth of any corresponding back link. As between the strength and depth values, the depth value is perceived as being the more reliably significant factor. The strength value determined for back links are recognized as being highly dependent on the number of users identified in the pool of transaction data records. Furthermore, the overall contribution to the confidence value by the strength and depth values will be dependent on the fundamental nature of the item being associated through the expert database 36. The contribution to the confidence in an item association is determined as $$AddedContribution_{BL} = q\left(Strength_{BL} * \frac{p}{Depth_{BL}}\right) \quad \text{Eq. 2}$$

where p and q are empirical scaling constants.

Thus, an efficient system and methods of generating expert databases that can be used to support decision processes with a high and well-discriminated degree of accuracy and reliability has been described. In view of the above description of the preferred embodiments of the present invention, many modifications and variations of the disclosed embodiments will be readily appreciated by those of skill in the art. It is therefore to be understood that, within the scope of the appended claims, the invention may be practiced otherwise than as specifically described above.

What is claimed is:

1. A method of enhancing the reliability and accuracy of a computer generated expert database, said method comprising the steps of:

a) first establishing a plurality of forward link associations between reference and related items having first respective weights;

b) second establishing a plurality of back link associations between reference and related items having second respective weights, wherein said pluralities of forward and back link associations have a defined correspondence; and c) storing, to an expert database, data records identifying said forward link associations as association rules including said first and second respective weights.

2. The method of claim 1 wherein said defined correspondence enables combination of said first and second respective weights.

3. The method of claim 2 wherein said plurality of forward link associations are determined from expert sub-populations identified relative to the reference items of said plurality of forward link associations.

4. The method of claim 3 said first respective weights are determined relative to respective expert sub-populations identified by actions taken against reference items.

5. The method of claim 1 wherein said plurality of back link associations correspond to a predetermined subset of said plurality of forward link associations and wherein said second respective weights are combinable with said first respective weights of said predetermined subset.

6. The method of claim 5 wherein said second respective weights include strength and depth terms, wherein each said depth term corresponds to the closure depth of a back link association on a chain series of forward link associations, and wherein said second respective weights are inversely proportional to respective depth terms.

7. The method of claim 6 wherein said strength terms are proportional to the support for respective back link associations relative to respective predetermined chain root forward link associations.

8. A method of preparing an association rules set for an expert database utilizing a computer to analyze a set of data records describing transactions involving users with respect to a predetermined set of items, said method comprising the steps of:

a) selecting, from the set of users identified by a set of transaction data records, sub-populations of expert users for respective reference items;

b) first computing a forward coupling graph of associations between reference items and related items, wherein forward link associations are defined with respect to said sub-populations of expert users, and wherein each said forward link association of said forward coupling graph has a first weighting;

c) second computing back link associations in said forward coupling graph, wherein said back link associations represent closures of chains of forward link associations, wherein each said back link association has a second weighting; and d) generating an association rule, including a third weight, for a predetermined forward link association wherein said third weight represents a combination of said first and second weightings for said predetermined forward link association.

9. The method of claim 8 wherein each of said sub-populations of expert users has at least a predetermined level of expertise, defined by predetermined criteria, with respect to a corresponding reference item.

10. The method of claim 9 wherein said predetermined level of expertise limits a predetermined sub-population of expert users to less than 50% of said set of users.

11. The method of claim 10 wherein said forward coupling graph excludes associations having less than a predetermined level of support by corresponding said sub-populations of expert users.

12. The method of claim 11 wherein said second weightings are inversely proportional to the respective number of associations between reference and related items necessary to establish said back links.

13. The method of claim 12 wherein said second weightings are further proportional to the strength of the associations coupled through respective each said back link associations.

14. A system for generating association rules for expert databases through the execution of a computer, said system comprising:

a) a first database storing a set of transaction data records;

b) a second database provided to store a set of association rules, wherein each said association rule defines an association weighting; and c) a computer coupled between said first and second databases, said computer implementing a selective analytic generation program for generating said set of association rules from said set of transaction data records wherein said selective analytic generation program provides for the identification of a set of back link associations within a set of forward link associations defined by said set of transaction data records, a subset of said set of association rules having a defined correspondence with said set of back link associations, the computation of respective back link weightings for said set of back link associations, and the incorporation of said back link weightings as respective components of said association weightings of said subset of said set of association rules.

15. The system of claim 14 wherein said set of transactions define actions by users with respect to items and wherein said computer is further coupled to receive predetermined analysis parameters for controlling the operation of said selective analytic generation program including a first parameter that defines sub-populations of users whose actions with respect to items determine the support for item corresponding association rules and a second parameter that defines of a minimum level of support required for each association rule to be included in said second database.

16. The system of claim 14 wherein said selective analytic generation program provides for identification of limited, item respective expert user sub-populations from which said set of forward link associations are selectively identified from said set of transaction data records.

17. The system of claim 16 wherein said expert user sub-populations include user sub-populations that are less than 50% of the user population identified in said set of transaction data records.

18. The system of claim 17 wherein said set of forward link associations is constrained to forward link associations having defined support determined in relationship to said item respective expert user sub-populations.

19. The system of claim 18 wherein the respective back link weightings for said set of back link associations are determined with respect to a defined threshold support for the back link corresponding forward link associations of said set of forward link associations.

20. The system of claim 19 wherein the respective back link weightings for said set of back link associations are further inversely proportional to the depth of the back links in the respective series of forward link associations.

21. The system of claim 20 wherein the respective back link weightings for said set of back link associations are further proportional to the relative size of the item specific expert user sub-populations corresponding to the back link associations and the user population identified in said set of transaction data records.

22. The system of claim 21 wherein said selective analytic generation program is responsive to predetermined analysis parameters including a first parameter controlling the size of said item specific expert user sub-populations and a second parameter determining said defined threshold support.

23. A process of generating an expert database through the execution of a computer based analysis of a set of transaction records representing user actions taken with respect to a defined set of items, said process comprising the steps of:
   a) first identifying, for each of a plurality of reference items, respective expert user sub-populations of the users identified in said set of transactions;
   b) second identifying, for each of said expert user sub-populations, sets of related items;
   c) constructing an item association data structure representing forward linked associations between said reference items and said sets of related items;
   d) pruning said item association data structure to reflect a minimum defined support for respective forward link associations;
   e) third identifying back linked associations between reference items and related items within said item association data structure, each said back linked association corresponding to a forward linked association;
   f) determining a back link weightings for each of said back linked associations; and
   g) generating association rules from said association data structure including associating said back link weightings with the association rules generated from the back linked association corresponding forward linked associations.

24. The process of claim 23 wherein each said expert user sub-population represents a respective minority of the users identified in said set of transactions whose actions taken with respect to corresponding reference items are the most significant.

25. The process of claim 23 wherein said expert user sub-populations are distinguished based on the cumulative weights assigned to the transactions taken by respective users relative to corresponding ones of said reference items.

26. The process of claim 25 wherein said minimum defined support includes a threshold constant.

27. The process of claim 26 wherein said minimum defined support further includes a proportionality of the support to the number of members of a reference item corresponding expert user sub-population.

28. The process of claim 27 wherein said back link weights are proportional to the depth number of forward linked associations identified with said back linked associations and the support for said forward linked associations corresponding to said back linked associations.

* * * * *